US009811865B2

(12) United States Patent
Baliyan et al.

(10) Patent No.: US 9,811,865 B2
(45) Date of Patent: Nov. 7, 2017

(54) METHOD AND APPARATUS FOR MEASURING PERCEPTIBLE PROPERTIES OF MEDIA CONTENT

(71) Applicant: Adobe Systems Inc., San Jose, CA (US)

(72) Inventors: Sharad Baliyan, Ahmedabad (IN); Nakul Kumar, Bangalore (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 174 days.

(21) Appl. No.: 13/621,428

(22) Filed: Sep. 17, 2012

(65) Prior Publication Data
US 2014/0082493 A1    Mar. 20, 2014

(51) Int. Cl.
| | |
|---|---|
| *G06F 3/01* | (2006.01) |
| *G06F 15/16* | (2006.01) |
| *G06Q 50/00* | (2012.01) |
| *G06Q 10/10* | (2012.01) |
| *H04N 1/00* | (2006.01) |
| *H04N 1/32* | (2006.01) |

(52) U.S. Cl.
CPC ........... *G06Q 50/01* (2013.01); *G06Q 10/101* (2013.01); *H04N 1/00005* (2013.01); *H04N 1/00068* (2013.01); *H04N 1/32101* (2013.01); *H04N 2201/3225* (2013.01); *H04N 2201/3273* (2013.01); *H04N 2201/3274* (2013.01)

(58) Field of Classification Search
CPC ........... H04N 5/44543; H04N 21/4622; H04N 21/47; G11B 27/34; G11B 27/034; G06Q 30/02; G06F 15/16

USPC ....... 715/774, 722, 726, 753, 757, 233, 810; 703/1; 707/1, 722
See application file for complete search history.

(56) References Cited

U.S. PATENT DOCUMENTS

| | | | | |
|---|---|---|---|---|
| 5,694,544 | A  * | 12/1997 | Tanigawa et al. ............. | 715/753 |
| 6,847,733 | B2 * | 1/2005  | Savakis et al. ................ | 382/225 |
| 7,693,856 | B2 * | 4/2010  | Arrouye et al. ........ | 707/999.101 |
| 7,831,728 | B2 * | 11/2010 | Ryman .......................... | 709/231 |
| 7,865,522 | B2 * | 1/2011  | Purdy et al. ................... | 707/790 |
| 7,970,922 | B2 * | 6/2011  | Svendsen ...................... | 709/231 |

(Continued)

FOREIGN PATENT DOCUMENTS

| | | |
|---|---|---|
| WO | 2009051342 A1 | 4/2009 |
| WO | 2010109057 A1 | 9/2010 |
| WO | 2011155703 A2 | 12/2011 |

OTHER PUBLICATIONS

Sparling, Isaac, and Shilad Sen. "Rating: How Difficult is it?" Oct. 23, 2011. ACM 2011. DOI: 10.1145/2043932.2043961. pp. 149-156.*

(Continued)

*Primary Examiner* — Jennifer To
*Assistant Examiner* — Jasmine Wan
(74) *Attorney, Agent, or Firm* — Keller Jolley Preece

(57) ABSTRACT

A method and apparatus for measuring perceptible properties of media content. The method comprises displaying media content comprising a plurality of perceptible properties; receiving a selection of an perceptible property from the plurality of perceptible properties; receiving at least one comment related to the selected perceptible property in the plurality of perceptible properties; and calculating a measurement of an overall quality of the media content based on the received at least one comment.

20 Claims, 9 Drawing Sheets

(56) References Cited

U.S. PATENT DOCUMENTS

| | | | |
|---|---|---|---|
| 2002/0054146 A1* | 5/2002 | Fukumoto | G06F 3/0482 715/810 |
| 2007/0011606 A1* | 1/2007 | Bagheri | G06F 17/243 715/233 |
| 2007/0115256 A1 | 5/2007 | Lee et al. | |
| 2007/0220081 A1* | 9/2007 | Hyman | 709/203 |
| 2007/0271338 A1* | 11/2007 | Anschutz | 709/204 |
| 2008/0092182 A1* | 4/2008 | Conant | 725/109 |
| 2008/0262995 A1* | 10/2008 | Zweig et al. | 707/1 |
| 2009/0132933 A1* | 5/2009 | Faski | G06Q 10/10 715/753 |
| 2009/0271283 A1* | 10/2009 | Fosnacht et al. | 705/26 |
| 2010/0030578 A1* | 2/2010 | Siddique | G06Q 10/0637 705/3 |
| 2010/0145790 A1* | 6/2010 | Brignull | G06Q 30/02 705/14.41 |
| 2010/0269130 A1* | 10/2010 | Gupta | 725/28 |
| 2011/0119256 A1* | 5/2011 | Matsuda | 707/722 |
| 2011/0208822 A1* | 8/2011 | Rathod | 709/206 |
| 2011/0249299 A1* | 10/2011 | Wu | G06K 9/2063 358/3.26 |
| 2012/0179757 A1* | 7/2012 | Jones et al. | 709/204 |
| 2012/0185782 A1* | 7/2012 | Storage | 715/757 |
| 2012/0209751 A1* | 8/2012 | Chen et al. | 705/27.2 |
| 2012/0268612 A1* | 10/2012 | Wang et al. | 348/207.1 |
| 2012/0284343 A1* | 11/2012 | Lee et al. | 709/206 |
| 2012/0290953 A1* | 11/2012 | Russell et al. | 715/758 |
| 2012/0291059 A1* | 11/2012 | Roberts et al. | 725/25 |
| 2013/0090894 A1* | 4/2013 | Dikerman et al. | 703/1 |
| 2013/0339437 A1* | 12/2013 | De Armas | G06F 17/30274 709/204 |

OTHER PUBLICATIONS

Jose San Pedro, Tom Yeh, Nuria Oliver, "Leveraging User Comments For Aesthetic Aware Image Search Reranking", WWW 2012—Session: Obtaining and Leveraging User Comments, Apr. 16-20, 2012, Lyon, France, 10 pgs.

* cited by examiner

METHOD AND APPARATUS FOR MEASURING PERCEPTIBLE PROPERTIES OF MEDIA CONTENT

BACKGROUND OF THE INVENTION

Field of the Invention

Embodiments of the present invention generally relate to media content analysis and, more particularly, to method and apparatus for measuring perceptible properties of media content.

Description of the Related Art

The Internet has become a place for artists, photographers, musicians, and novice film makers, hereafter referred to as authors, to publish their work (also referred to as media content). The media content may be any electronic media intended for publication, such as a photograph, an image of a painting, a video, an audio file, a sketch, or other visual artwork. Web sites such as TUMBLR®, FACEBOOK®, FLICKR®, and the like provide a mechanism for authors to publish their media content and receive comments from the public, hereafter referred to as reviewers. These sites offer reviewers the ability to provide comments to the author in the form of a "like" graphic indication or a text comment.

Comments typically address the media content as a whole. For example, a reviewer may "like" an image; however, in order to provide feedback on a particular visual quality of the image, such as contrast, focus, brightness, composition, sound or other perceptible property, the reviewer must provide feedback in the form of a text comment. Text comments are difficult to quantify. Further, such feedback mechanisms make it difficult to provide details regarding a location within the media content that a reviewer is addressing in the text comment.

Therefore, there is a need in the art for a method and apparatus for measuring perceptible properties of media content.

SUMMARY

Embodiments of the present invention relate to method and apparatus for measuring perceptible properties of media content. The method and apparatus display media content comprising a plurality of perceptible properties. The method and apparatus receive a selection of a perceptible property from the plurality of perceptible properties and receive at least one comment related to the selected perceptible property in the plurality of perceptible properties. The method and apparatus calculate a measurement of an overall quality of the media content based on the received at least one comment.

Figure 1:
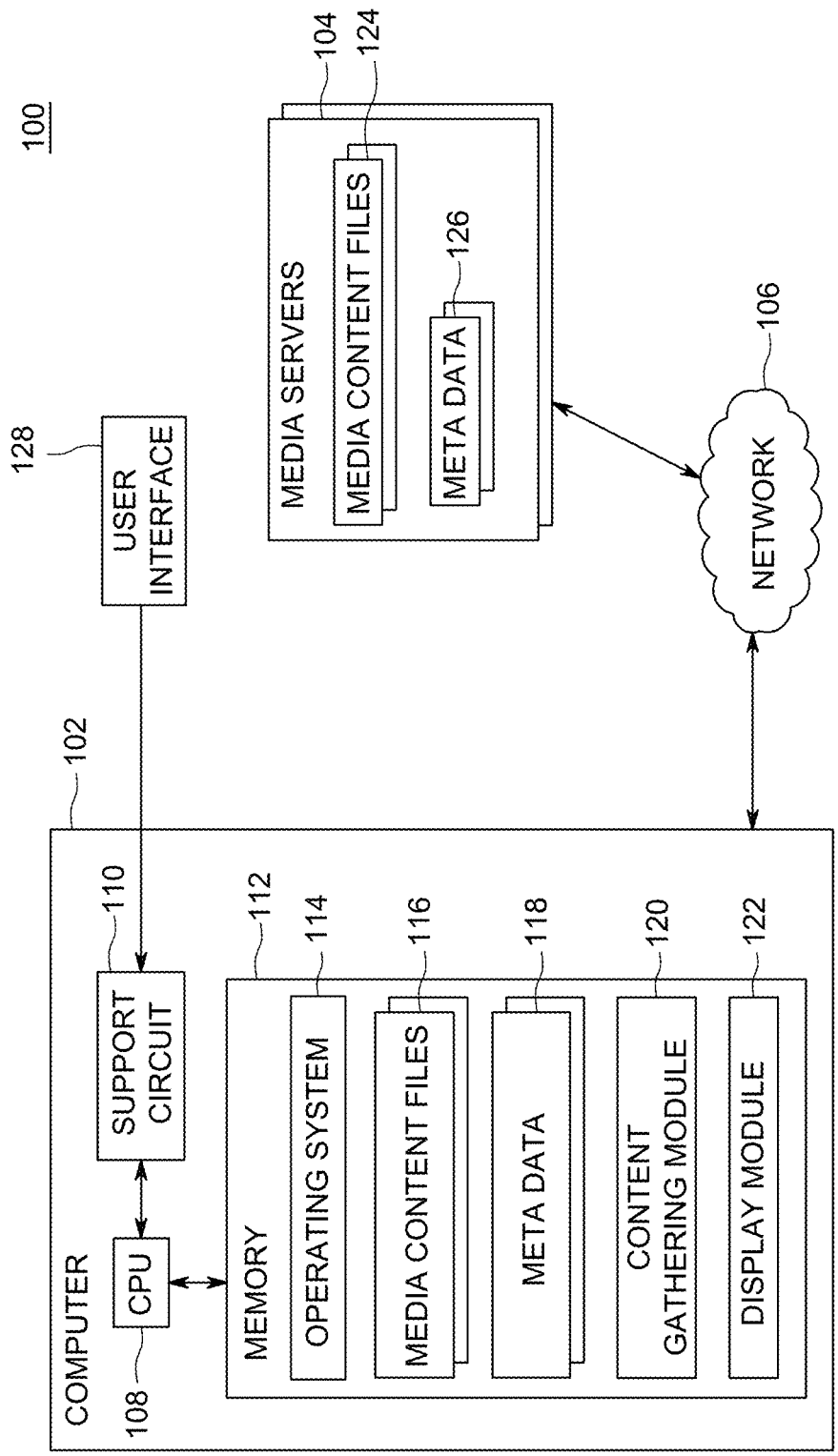
FIG. 1 depicts a block diagram of a system for measuring perceptible properties of media content, according to one or more embodiments.

While the method and apparatus is described herein by way of example for several embodiments and illustrative drawings, those skilled in the art will recognize that method and apparatus for measuring perceptible properties of media content is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of method and apparatus for measuring perceptible properties of media content defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Embodiments of the present invention comprise a method and apparatus for measuring the perceptible properties of media content, such as a photograph, artwork, audio, video and the like, based on visual properties, such as brightness, contrast, color, sharpness, focus, composition, among others. Media content is displayed to a reviewer. The media content is associated with a metadata file. The metadata comprises details about the artist, photographer, composer or videographer, hereafter referred to as the "author" of the media content. The metadata also comprises information about the media content. For example, if the media content is a photograph, the metadata may include the type of camera and lens that were used to take the photograph, the shutter speed, the ISO, and the like. If the media content file is an image of a painting, the metadata may contain the medium used, the type of paper, canvas, or other surface used, and the like, as well as metadata about the camera and lens used to make the content file. The reviewer may provide comments regarding different perceptible properties of the media content file. For example, the reviewer may provide a "visual comment" that the reviewer likes or dislikes the brightness, the composition, the focus, the contrast and the like. In addition, the reviewer may select an area of the media content on which to comment using a selection tool to draw a circle around the area of the media content for which the comment is intended. A reviewer may also input a "text comment" about different properties of the media content or about the overall media content. All comments are stored as metadata along with an identity of a reviewer in the form of a userID, login or screen name and the date and time of the comment. Comments made by various reviewers of the media content may be viewed along with quantitative measurements of the comments, for example, the number of reviewers who like the contrast and the number of reviewers who like the composition of the media content. A reviewer may also perform a search for media content. For example, a reviewer may search for all media content by a specific author or with a high measurement of composition quality. The media content retrieved in the search are ranked based on reviewer comments and displayed in order of most liked to least liked.

Advantageously, software applications, such as such as ADOBE® PHOTOSHOP® Elements, ADOBE® PREMIERE® Elements, or ADOBE® Revel™ may utilize the metadata information to organize or search media content based on properties, such as brightness, contrast and other properties of the media content as well as a calculated measurement of these properties. In addition, embodiments of the invention may provide social media sites, such as TUMBLR®, FACEBOOK® or FLICKR® the ability for their users to provide contextual comments in the feedback.

Various embodiments of method and apparatus for measuring perceptible properties of media content are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. The term media content is meant to include, but is not limited to audio, text, still images, such as photographs, moving images, such as video or animation, interactive content, or any combination of multimedia.

FIG. 1 depicts a block diagram of a system 100 for measuring perceptible properties of media content, according to one or more embodiments. The system 100 comprises a computer 102, and a plurality of media servers 104 communicatively coupled via a network 106. The computer 102 includes a CPU 108, support circuits 110, a memory 112 and user interface 128. The CPU 108 may comprise one or more commercially available microprocessors or microcontrollers that facilitate data processing and storage. The various support circuits 110 facilitate the operation of the CPU 108 and include one or more clock circuits, power supplies, cache, input/output circuits, displays, and the like. The memory 112 comprises at least one of Read Only Memory (ROM), Random Access Memory (RAM), disk drive storage, optical storage, removable storage and/or the like. The memory 112 comprises an operating system 114, one or more media content files 116, a comment gathering module 120, and a display module 122. Each media content file 116 is associated with metadata 118.

The operating system 114 generally manages various computer resources (e.g., network resources, file processors, and/or the like). The operating system 114 is configured to execute operations on one or more hardware and/or software modules, such as Network Interface Cards (NICs), hard disks, virtualization layers, firewalls and/or the like. Examples of the operating system 114 may include, but are not limited to, Linux, Mac OSX, BSD, Unix, Microsoft Windows, and the like.

The media servers 104 may be social media sites or other electronic publishing servers that comprise media content file 124. The media content file 124 is associated with metadata 126.

The display module 122 displays the media content file 116, 124 via the user interface 128. The media content file 116, 124 may be stored on the computer 102 or on the media server 104. A reviewer may interact with the media content file 116, 124 via the user interface 128. The reviewer may select an option to view information regarding the media content file 116, 124. Information regarding the media content file 116 is contained in the metadata 118, 126. Metadata 118, 126 comprises information regarding the author of the media content file 116, 124 such as the author's name, and may include additional biographical information regarding the author. Metadata 118, 126 may also comprise information regarding the media content file 116, 124. For example, if the media content file 116, 124 is a photograph, the metadata may include the type of camera and lens that were used to take the photograph, the shutter speed, the ISO, and the like. If the media content file 116, 124 is an image of a painting, the metadata may contain the medium used, the type of paper, canvas, or other surface used, and the like. Metadata 118, 126 also comprises any comments that may have been provided by reviewers regarding the media content file 116, 124. The display module 122 displays the information from the metadata 118, 126.

The reviewer may select an option to add comments about the media content file 116, 124. The comment gathering module 120 allows the reviewer to add visual comments or text comments. When the reviewer chooses to add visual comments, the reviewer may select the perceptible property on which the reviewer would like to comment, such as the composition, brightness, contrast, sharpness, or focus of the media content file 116, 124. The reviewer may also use a selection tool to encircle the area of the media content file 116, 124 to which the comment refers. The comment gathering module 120 allows the reviewer to select whether the reviewer likes or dislikes the perceptible property of the media content file 116, 124. The comment gathering module 120 stores the comments, the selected area of the media content file 116, 124 along with the identity of the reviewer and a date and time of the comment. The comment gathering module 120 stores the comments as metadata 116, 126.

The reviewer, or more likely, the author of the media content file 116, 124 may select an option to view comments. The display module 122 displays a quantitative summary of the comments. For example, the display module 122 displays a number of reviewers that like the contrast, the number of reviewers that like the composition, and number of reviewers that like the focus. The display module 122 may also include the identity of the reviewers who added the comments and how much time has passed since the last comment was added. A perceptible property may be selected, such as contrast, and areas of the media content file 116, 124 that were selected by reviewers using the selection tool are indicated on the media content file 116, 124. In addition, the display module 122 provides an option to view text comments added about the media content file 116, 124.

The display module 122 provides a search capability to allow a reviewer to search for media content file 116, 124 based on various properties of the media content file 116, 124. For example, the reviewer may search for a specific author, photographs taken with a specific camera or lens, or images with an interesting contrast. The display module 122 retrieves media content file 116, 124 that meet the selected criteria and display the media content file 116, 124 in order from the media content file 116, 124 with the most likes to the media content file 116, 124 with the least likes.

Figure 2:
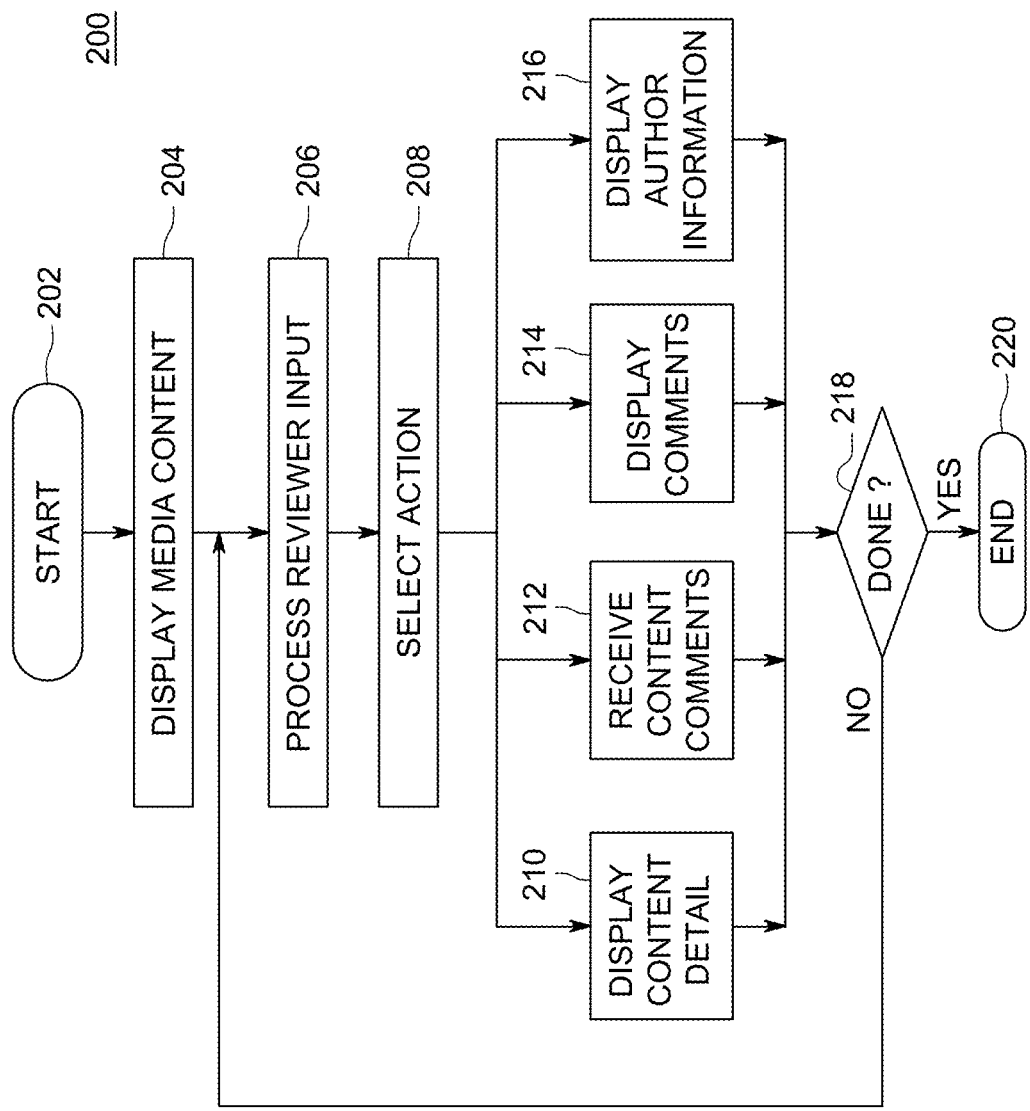
FIG. 2 depicts a flow diagram of a method for adding and viewing comments and content information regarding media content as performed by the comment gathering module and display module of the system of FIG. 1, according to one or more embodiments.

FIG. 2 depicts a flow diagram of a method 200 for adding and viewing comments and content information regarding media content as performed by the comment gathering module 120 and display module 122 of the system 100 of FIG. 1, according to one or more embodiments. The method 200 displays media content and allows a reviewer to add comments regarding the media content or view comments and other information about the media content. The method 200 starts at step 202 and proceeds to step 204.

At step 204, the method 200 displays media content. The media content may be located on a local computer or may be stored remotely. The media content may be any electronic media, such as a photograph, an image of a painting, audio, video, sketch, or other artwork. The method 200 proceeds to step 206, where the method 200 processes reviewer input. Reviewer input may be received from a touch screen on a mobile device, from a mouse click, from a button selection on a keypad, or other input device. The method 200 proceeds to step 208, where the method 200 selects an action based on the reviewer input. It is appreciated that although FIG. 2 illustrates four potential actions, other embodiments envision additional possible actions.

In one embodiment, the method 200 selects a display content detail action and proceeds to step 210. At step 210, the method 200 accesses metadata associated with the media content and displays details about the media content. For example, if the media content is a photograph, the method 200 may display the type of camera and lens that were used to take the photo, the shutter speed, the ISO, and the like. If the media content is an image of a painting, the method 200 may display the medium used, the type of paper, canvas, or other surface used, and the like.

In another embodiment, the method 200 selects a receive content comments action and proceeds to step 212. At step 212, the method 200 receives content comments as described in more detail with respect to FIG. 3, below. In yet another embodiment, the method 200 selects a display comments action and proceeds to step 214. At step 214, the method 200 displays visual and text comments. The method 200 displays each perceptible property of the media content for which there are visual comments. With each property, a number of likes is displayed. Optionally, the method 200 lists the identities of the reviewers and the time the last comment was provided. If any text comments were provided, the method 200 displays the text comments.

Alternatively, the method 200 selects a display author information action and proceeds to step 216. At step 216, the method 200 accesses metadata associated with the media content and displays details about the author of the media content, whether the author. The method 200 may display a name of the author and may display other biographical information about the author. The method 200 proceeds to step 218, where the method 200 determines whether the reviewer is done reviewing the media content. If the reviewer is not done reviewing the media content, the method 200 proceeds to step 206 and continues to process reviewer input until the reviewer is done reviewing the media content at which time the method 200 proceeds to step 220 and ends.

Figure 3:
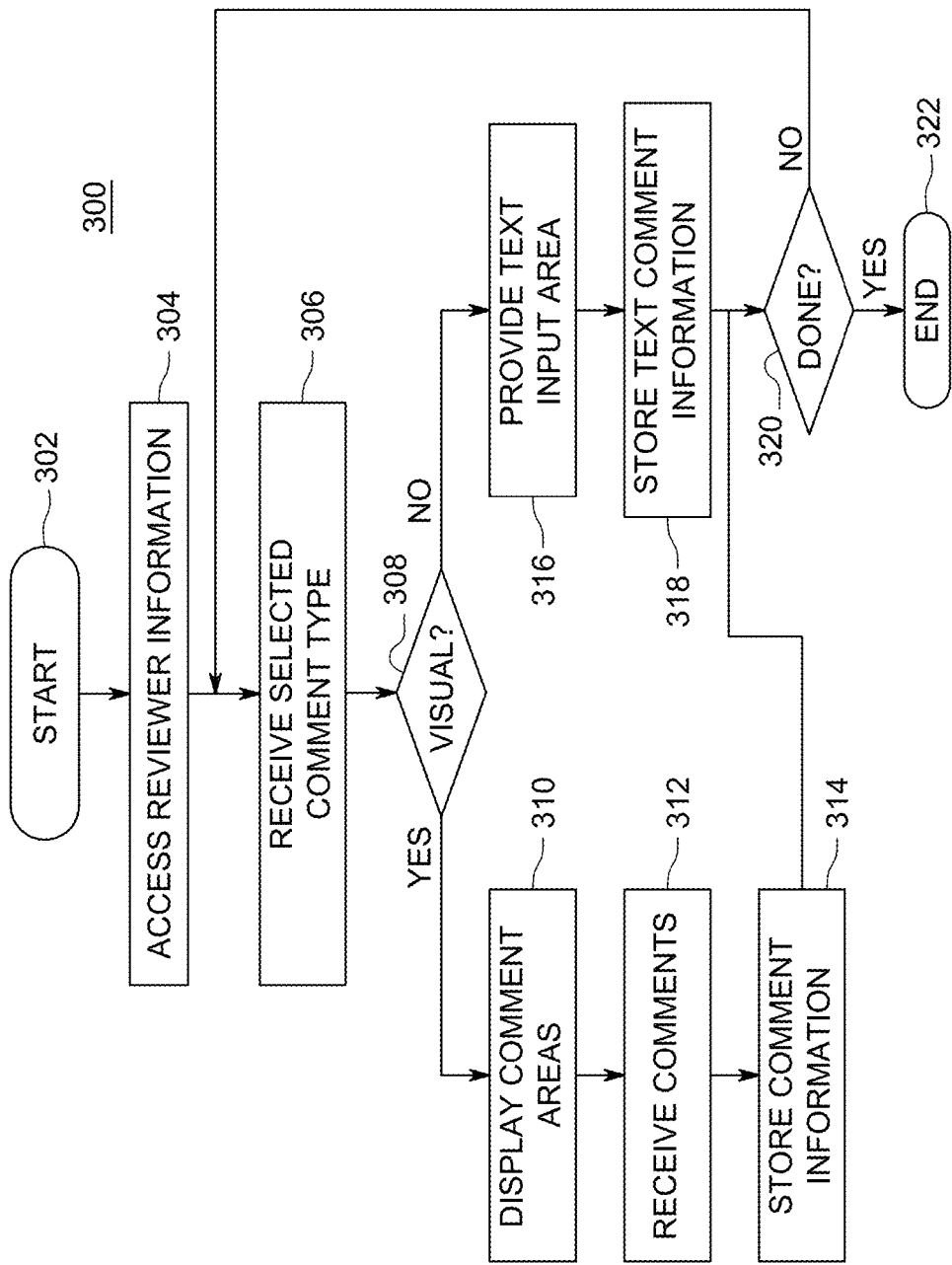
FIG. 3 depicts a flow diagram of a method for receiving content comments as performed by the comment gathering module of FIG. 1, according to one or more embodiments.

FIG. 3 depicts a flow diagram of a method 300 for receiving content comments as performed by the comment gathering module 120 of FIG. 1, according to one or more embodiments. The method 300 receives comments input by a reviewer and stores the comments with reviewer information as metadata associated with the media content. The method 300 starts at step 302 and proceeds to step 304.

At step 304, the method 300 accesses reviewer identity information. Reviewer identity information may be a user id, login, or screen name of the reviewer. The reviewer identity information is stored with comments provided by the reviewer. The method 300 proceeds to step 306 where the method 300 receives a selection for a type of comment to be entered. A comment may be a visual comment or a text comment. A visual comment is any comment that is not a text comment. A visual comment comprises at least one property of the media content, such as the brightness, contrast, composition, focus, and the like. The visual comment also comprises an indicator, which in some embodiments may be a "like" or "dislike" indicator, for each of the properties. Optionally, the visual comment comprises an additional component of a selected area of the media content for which the comment is intended. For example, a reviewer may select an area of the media that is out of focus and select a "dislike" indicator. The dislike focus comment is then associated with just that selected area of the media content. A text comment is any remark, observation or criticism provided by a reviewer that may address all or only a selected area of the media content, a property of the media content, the author or creator of the media content, or any thoughts by the reviewer.

The method 300 proceeds to step 308, where the method 300 determines whether the reviewer has selected to provide a visual comment or a text comment. If the method 300 determines the reviewer has selected to provide a visual comment, the method 300 proceeds to step 310. At step 310, the method 300 displays icons for various properties or areas of interest regarding the media content for which comments may be provided. In some embodiments, comments may be provided about the composition, the brightness, the contrast, the focus, and/or the author of the media content. In other embodiments, comments may be provided about other aspects of the media content, such as the framing, field depth, subject placement, or other areas of interest in the media content.

The method 300 proceeds to step 312, where the method 300 receives reviewer comments. A reviewer selects an icon indicating which specific property of the media content the reviewer would like to provide a comment. For example, the reviewer may select the composition icon. Optionally, the reviewer may also select an area of the media content using a selection tool so the comment can be associated with a specific area of the media content. The reviewer then selects a "like" indicator or a "dislike" indicator. "Like" and "dislike" indicators may be radio buttons, icons, or any available indicators to express the opinion of the reviewer as a comment. The reviewer may iterate through the process of selecting icons associated with different properties, selecting specific areas of the media content, and indicating an opinion of "like" or "dislike".

The method 300 proceeds to step 314, where the method 300 stores the reviewer comments. The method 300 stores the property, such as composition or contrast, with the "like" or "dislike" indication and the specific area of the media content to which the comment applies (if any). The method 300 stores the comments as metadata associated with the media content. The method 300 also stores the identity of the reviewer and the current date and time with the comments. The method 300 proceeds to step 320.

If at step 308, the method 300 determines the reviewer has selected an option to provide a text comment, the method 300 proceeds to step 316, where the method 300 provides a text input area. When the reviewer has finished inputting the text comment, the method 300 proceeds to step 318, where the method 300 stores the text comment. The text comment is stored as metadata associated with the media content. The method 300 also stores the identity of the reviewer and the current date and time with the comment. The method 300 proceeds to step 320.

At step 320, the method 300 determines whether the reviewer is done providing comments. If the method 300 determines that the reviewer is not done making comments, the method 300 proceeds to step 306, where the method 300 receives and stores comments until the reviewer is done providing comments. When the method 300 determines the reviewer is done providing comments, the method 300 proceeds to step 322 and ends.

Figure 4:
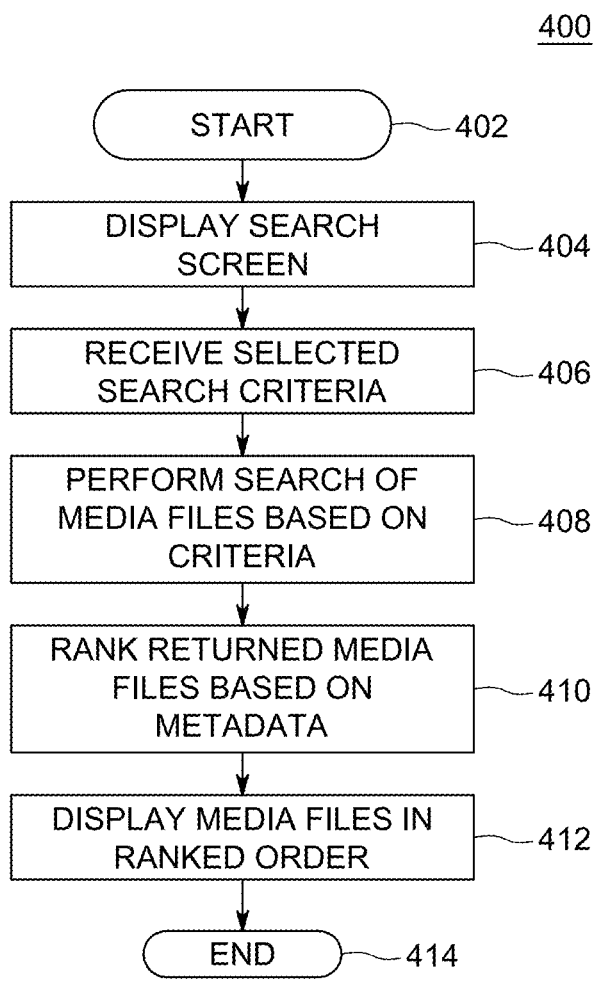
FIG. 4 depicts a flow diagram of a method for retrieving media content based on a measured overall quality as performed by the display module of FIG. 1 according to one or more embodiments.

FIG. 4 depicts a flow diagram of a method 400 for searching for media content based on a measured overall quality performed by the display module 122 of FIG. 1, according to one or more embodiments. The method 400 retrieves media content based on search criteria, ranks and displays them in order from most likes to least likes. The method 400 starts at step 402 and proceeds to step 404.

At step 404, the method 400 displays a search screen comprising different criteria under which the media content may be searched. The search criteria may include, but is not limited to the author, a type of camera for a photograph, a medium for an artwork, or a perceptible quality such as brightness, contrast, focus, or composition. The method 400 proceeds to step 406, where the method 400 receives the search criteria. The method 400 proceeds to step 408, where the method 400 performs the search based on the selected criteria. The method 400 retrieves the media content and their associated metadata.

The method 400 proceeds to step 410, where the media content are ranked based on a measure of the comments in the metadata. For example, if the search criteria were for a specific photographer, all photographs by that photographer are retrieved. The total number of likes is calculated by adding all of the likes for all of the different properties of the photograph. The photographs are rank from most likes to least likes. The method 400 proceeds to step 412, where the method 400 displays the media content according to their ranking. The method 400 proceeds to step 414 and ends.

Figure 5:
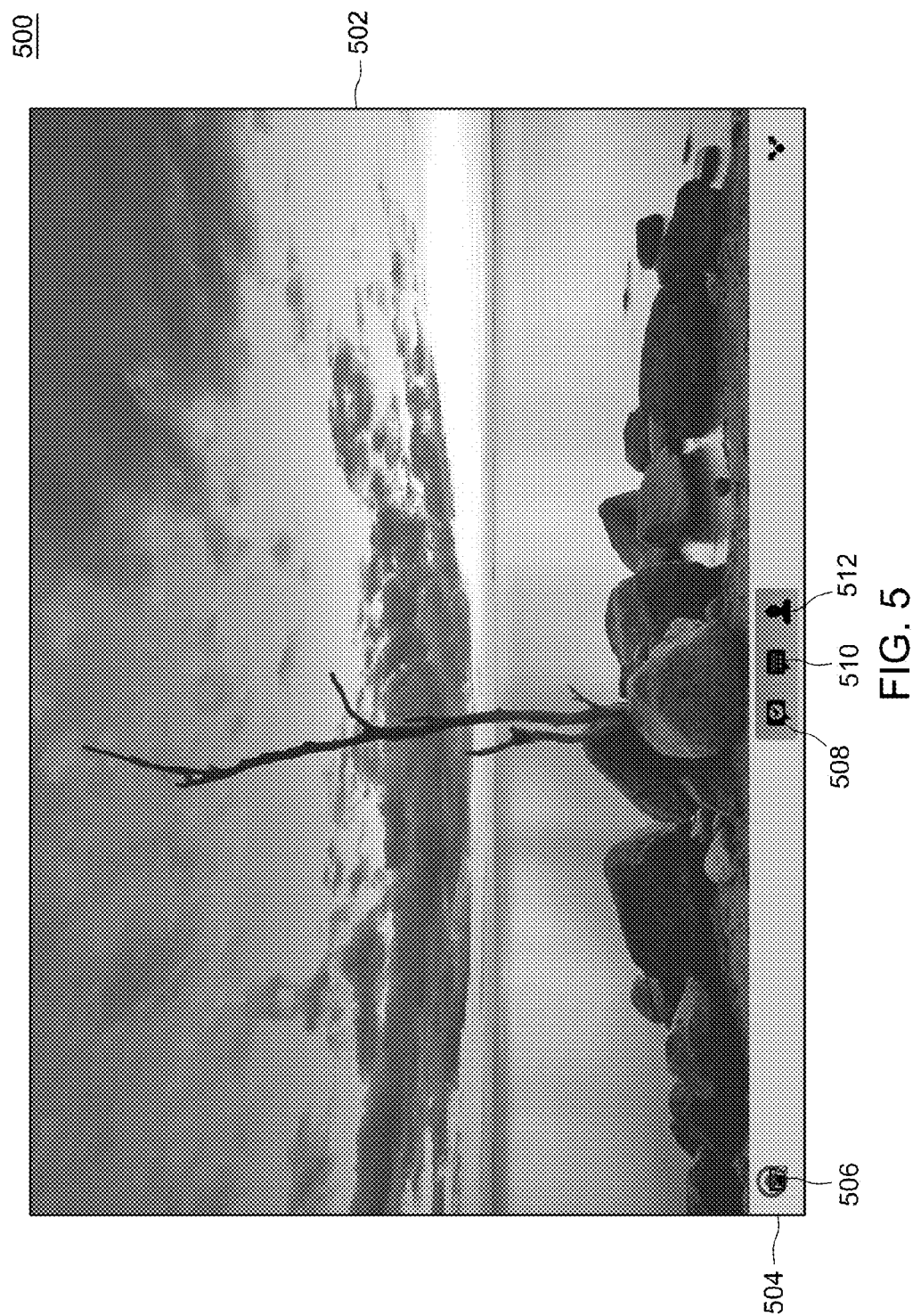
FIG. 5 illustrates a display screen of a user interface 500, according to one or more embodiments.

FIG. 5 illustrates a display screen of a user interface 500, according to one or more embodiments. The user interface 500 comprises media content 502 and a toolbar 504. The toolbar 504 comprises a view media information icon 506, a view comments icon 508, an add comments icon 510, and a view author information icon 512. Selection of the view media information icon 506 causes the display of information stored in metadata about the media content. For example, if the media content is a photograph, selecting the view media information icon 510 displays information such as the type of camera and lens that were used to take the photo, the shutter speed, the ISO, and the like. If the media content file is an image of a painting, selecting the view media information icon 510 displays information such as the medium used, the type of paper, canvas, or other surface used, and the like.

Selection of the view comments icon 508 causes the display of comments as depicted in further detail with respect to FIG. 6 below. Selection of the add comments icon 510 allows for the addition of comments as depicted in further detail with respect to FIG. 7 and FIG. 8, below. Selection of the view author information icon 512 causes the display of information stored in metadata regarding the author of the media content 502. The information may include the identity of the author and any additional biographical information or other information of interest about the author.

Figure 6:
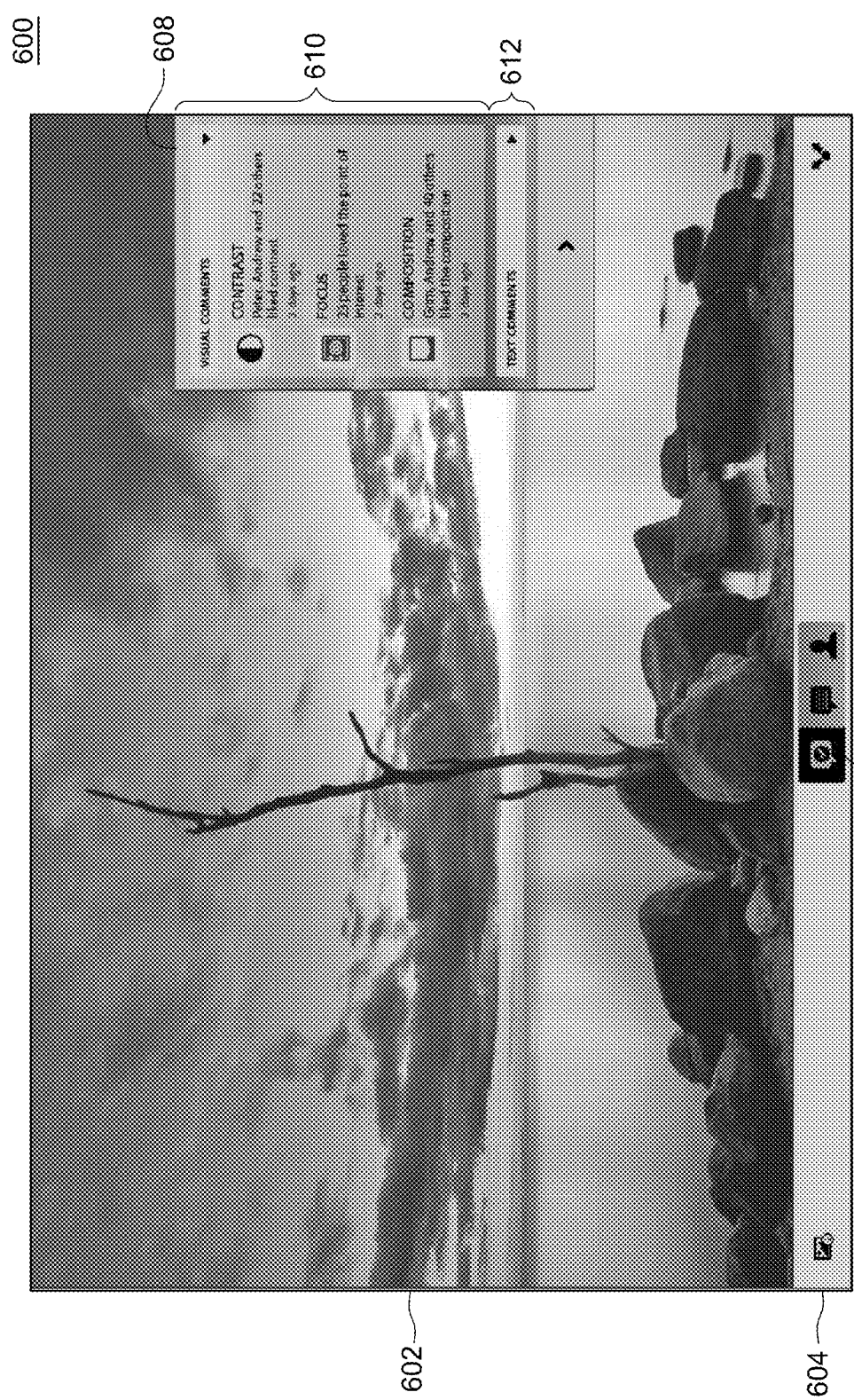
FIG. 6 illustrates a display screen of a user interface 600 for displaying comments regarding media content, according to one or more embodiments.

FIG. 6 illustrates a display screen of a user interface 600 for displaying comments regarding media content, according to one or more embodiments. The user interface 600 comprises the media content 602, a toolbar 604, and a comments display area 608. When a reviewer selects the view comments icon 606 from the toolbar 604, a comments display area 608 appears. The comments display area 608 comprises a visual comments display area 610 and a text comments display area 612. In the user interface 600, the visual comments area 610 is shown selected. Various properties of the media content are displayed in the visual comments display area 610 with a number of likes for each, the identities of the reviewers, and the time since the last comment was provided. Selecting the text comments 612, causes the display of any text comments provided by reviewers of the media content 602.

Figure 7:
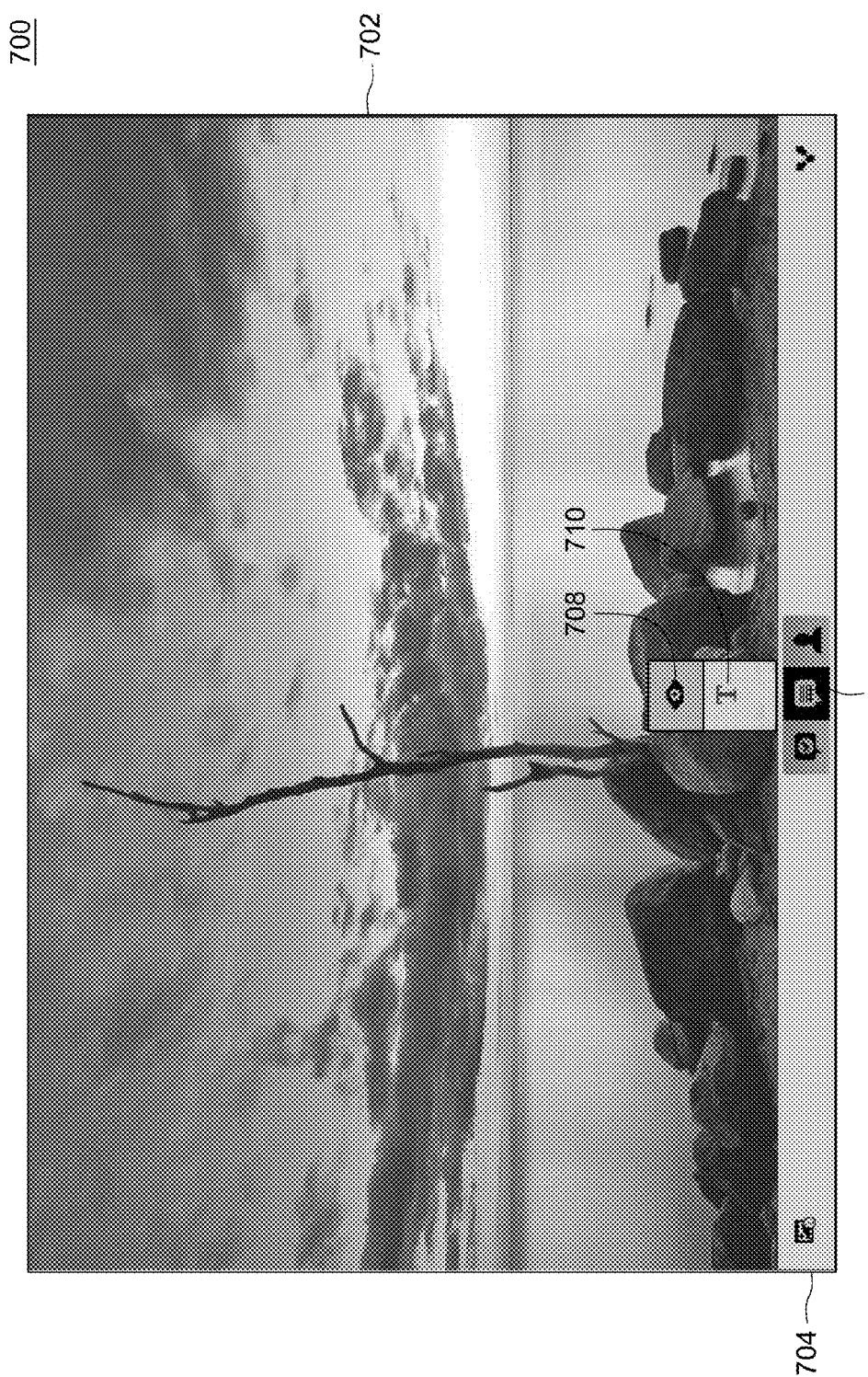
FIG. 7 illustrates a display screen of a user interface 700 for adding comments regarding media content, according to one or more embodiments.

FIG. 7 illustrates a display screen of a user interface 700 for adding comments regarding media content, according to one or more embodiments. The user interface 700 comprises the media content 702, a toolbar 704. When a reviewer selects the add comments icon 706, two icons appear, a visual comment icon 708 and a text comment icon 710. When a reviewer selects the text comment icon 710, the user may enter text comments in a text comment input area (not shown). If the reviewer selects the visual comment icon 708, specific properties and areas for which comments may be entered are displayed, as depicted in more detail with respect to FIG. 8, below.

Figure 8:
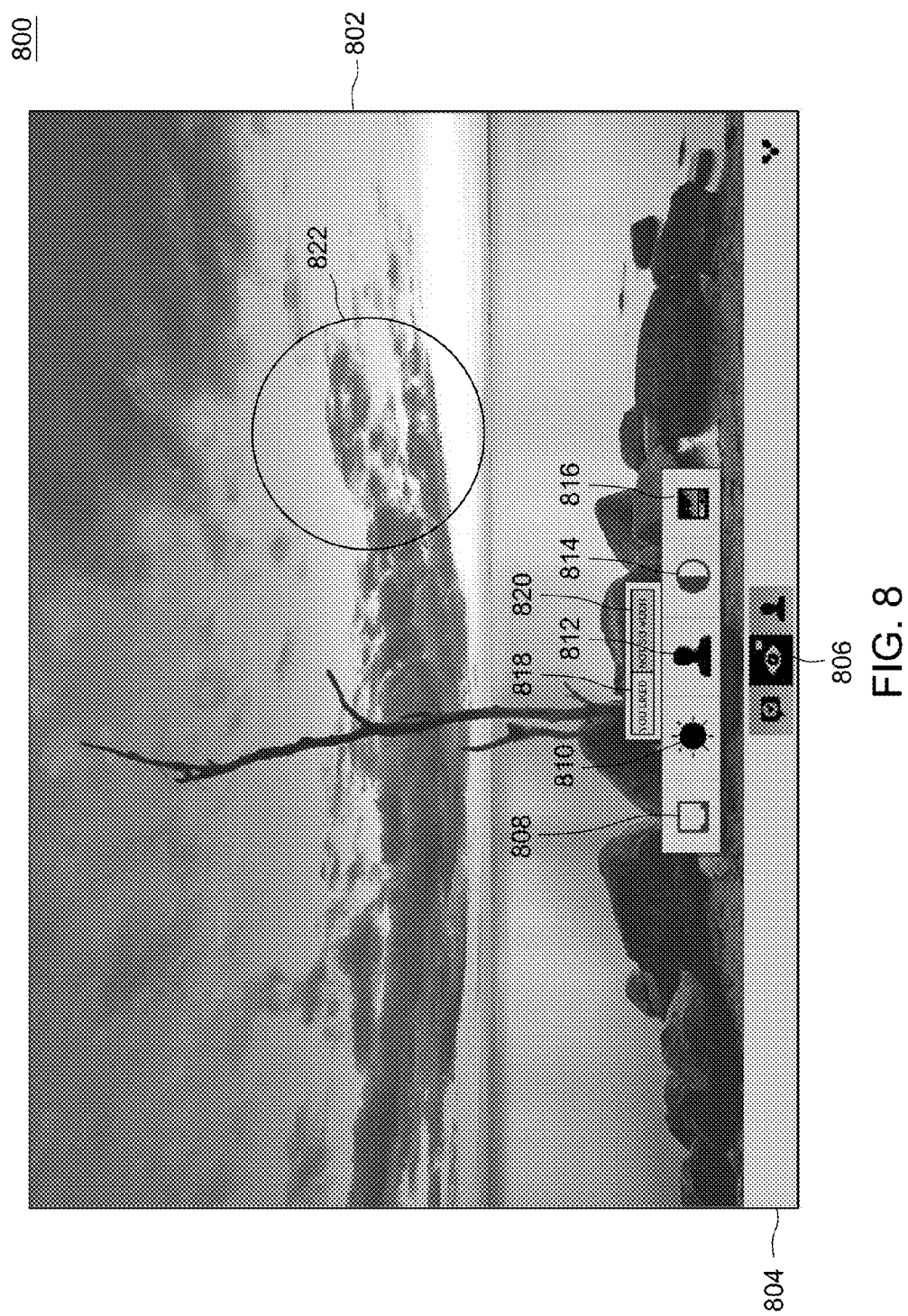
FIG. 8 illustrates a display screen of a user interface 800 for adding visual comments regarding media content, according to one or more embodiments.

FIG. 8 illustrates a display screen of a user interface 800 for adding visual comments regarding media content, according to one or more embodiments. The user interface 800 comprises the media content 802, a toolbar 804. The visual comments icon 806 appears in the toolbar 804 and indicates that visual (rather than text) comments may be entered. Icons 808, 810, 812, 814, and 816 appear, representing focus, brightness (or exposure), author, contrast, and composition, respectively. It is appreciated that although FIG. 8 illustrates five potential areas of interest of the media content, other embodiments of the present disclosure envision additional possible areas of interest. A reviewer may select an icon representing an area of interest on which to comment, and may optionally select an area of the content 822 on which to apply the comment. Finally, the reviewer selects a "like" indicator 818 or a "dislike" indicator 820. Upon selection of the "like" indicator 818 or "dislike" indicator 820, the comment is stored in metadata associated with the media content 802. A reviewer may make multiple comments indicating different areas of interest for the media content 802.

The embodiments of the present invention may be embodied as methods, system, apparatus, electronic devices, and/or computer program products. Accordingly, the embodiments of the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Example Computer System

Figure 9:
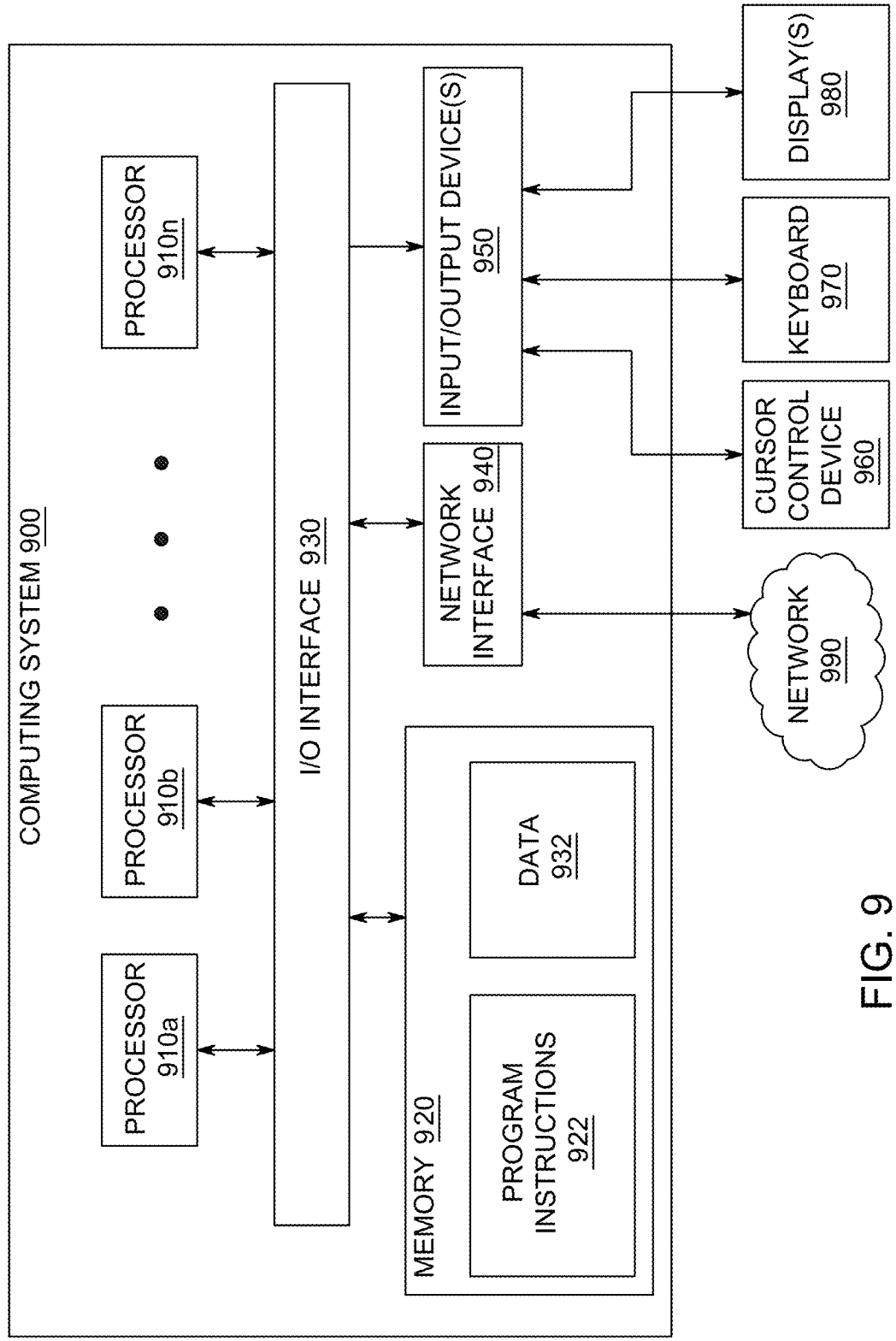
FIG. 9 depicts a computer system that is a computing device and can be utilized in various embodiments of the present invention, according to one or more embodiments.

FIG. 9 depicts a computer system that is a computing device and can be utilized in various embodiments of the present invention, according to one or more embodiments.

Various embodiments of method and apparatus for measuring perceptible properties of media content, as described herein, may be executed on one or more computer systems, which may interact with various other devices. One such computer system is computer system 900 illustrated by FIG. 9, which may in various embodiments implement any of the elements or functionality illustrated in FIGS. 1-8. In various embodiments, computer system 900 may be configured to implement methods described above. The computer system 900 may be used to implement any other system, device, element, functionality or method of the above-described embodiments. In the illustrated embodiments, computer system 900 may be configured to implement methods 200, 300, and 400, as processor-executable executable program instructions 922 (e.g., program instructions executable by processor(s) 910a-n) in various embodiments.

In the illustrated embodiment, computer system 900 includes one or more processors 910a-n coupled to a system memory 920 via an input/output (I/O) interface 930. The computer system 900 further includes a network interface 940 coupled to I/O interface 930, and one or more input/output devices 950, such as cursor control device 960, keyboard 970, and display(s) 980. In various embodiments, any of components may be utilized by the system to receive user input described above. In various embodiments, a user interface (e.g., user interface) may be generated and displayed on display 980. In some cases, it is contemplated that embodiments may be implemented using a single instance of computer system 900, while in other embodiments multiple such systems, or multiple nodes making up computer system 900, may be configured to host different portions or instances of various embodiments. For example, in one embodiment some elements may be implemented via one or more nodes of computer system 900 that are distinct from those nodes implementing other elements. In another example, multiple nodes may implement computer system 900 in a distributed manner.

In different embodiments, computer system 900 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 900 may be a uniprocessor system including one processor 910, or a multiprocessor system including several processors 910 (e.g., two, four, eight, or another suitable number). Processors 910*a-n* may be any suitable processor capable of executing instructions. For example, in various embodiments processors 910 may be general-purpose or embedded processors implementing any of a variety of instruction set architectures (ISAs), such as the PowerPC®, SPARC®, or MIPS® ISAs, or any other suitable ISA. In multiprocessor systems, each of processors 910*a-n* may commonly, but not necessarily, implement the same ISA.

System memory 920 may be configured to store program instructions 922 and/or data 932 accessible by processor 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 920. In other embodiments, program instructions and/or data may be received, sent or stored upon different types of computer-accessible media or on similar media separate from system memory 920 or computer system 900.

In one embodiment, I/O interface 930 may be configured to coordinate I/O traffic between processor 910, system memory 920, and any peripheral devices in the device, including network interface 940 or other peripheral interfaces, such as input/output devices 950. In some embodiments, I/O interface 930 may perform any necessary protocol, timing or other data transformations to convert data signals from one components (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network (e.g., network 990), such as one or more external systems or between nodes of computer system 900. In various embodiments, network 990 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 940 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 950 may, in some embodiments, include one or more display terminals, keyboards, keypads, touchpads, scanning devices, voice or optical recognition devices, or any other devices suitable for entering or accessing data by one or more computer systems 900. Multiple input/output devices 950 may be present in computer system 900 or may be distributed on various nodes of computer system 900. In some embodiments, similar input/output devices may be separate from computer system 900 and may interact with one or more nodes of computer system 900 through a wired or wireless connection, such as over network interface 940.

In some embodiments, the illustrated computer system may implement any of the methods described above, such as the methods illustrated by the flowcharts of FIGS. 2-4. In other embodiments, different elements and data may be included.

Those skilled in the art will appreciate that computer system 900 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, etc. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, etc.), ROM, etc.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer-implemented method comprising:
providing, for display to a user within a user interface, an instance of media content comprising a plurality of perceptible image quality properties of the instance of media content, wherein the plurality of perceptible image quality properties comprises at least one of a color, a brightness, an exposure, a contrast, a sharpness, a focus, framing, or field depth;
providing, within the user interface, a plurality of icons or menu items overlaying the instance of media content and each identifying a respective perceptible image quality property of the plurality of perceptible image quality properties, wherein the plurality of icons or menu items are user selectable for entry of comments;
receiving a user selection of a perceptible image quality property from the plurality of perceptible image quality properties of the instance of media content via a respective icon or menu item of the plurality of icons or menu items;
receiving at least one user comment related to the selected perceptible image quality property;
storing the at least one user comment related to the selected perceptible image quality property;
determining an overall visual quality of the instance of media content based, at least in part, on a like indication included in the stored at least one user comment; and
ranking the instance of media content relative to other instances of media content based on the determined overall visual quality of the instance of media content.

2. The method of claim 1, wherein the at least one user comment for the perceptible visual quality property of the instance of media content comprises the like indication and a dislike indication.

3. The method of claim 2, further comprising identifying an area of the instance of media content to which the at least one user comment applies.

4. The method of claim 1, wherein determining the overall visual quality of the instance of media content comprises calculating a measurement of the overall visual quality by adding a number of like indications received for all perceptible image quality properties in the plurality of perceptible image quality properties of the instance of media content for which there are user comments.

5. The method of claim 4, further comprising searching for and retrieving a plurality of instances of media content based on at least one perceptible image quality property.

6. The method of claim 5, wherein searching further comprises:
ranking the plurality of instances of media content based on calculated measurements of overall visual quality based on like indications for each of the plurality of instances of media content; and
displaying the plurality of instances of media content in accordance with the ranking.

7. The method of claim 1, wherein the at least one user comment comprises a text comment for the perceptible image quality property.

8. The method of claim 1, further comprising:
accessing identity information of the user that created the received at least one user comment; and
storing the identity information of the user with the received at least one user comment.

9. The method of claim 1, further comprising:
receiving a request to enter a comment; and
providing a toolbar comprising the icons or menu items corresponding to the plurality of perceptible image quality properties,
wherein receiving the selection of the perceptible image quality property comprises receiving a selection of an icon from the toolbar.

10. The method of claim 1, wherein the instance of media content is an image file or a video file.

11. An apparatus for gathering and utilizing comments relating to perceptible image quality properties of media content comprising:
at least one processor; and
at least one non-transitory computer readable storage medium storing instructions thereon, that, when executed by the at least one processor, cause the apparatus to:
provide, for display to a user within a user interface, an instance of media content comprising a plurality of perceptible image quality properties of the instance of media content, wherein the plurality of perceptible image quality properties comprises at least one of a color, a brightness, an exposure, a contrast, a sharpness, a focus, framing, or field depth;
provide, within the user interface, a plurality of icons or menu items overlaying the instance of media content and each identifying a respective perceptible image quality property of the plurality of perceptible image quality properties, wherein the plurality of icons or menu items are user electable for entry of comments;
receive a user selection of a perceptible image quality property from the plurality of perceptible image quality properties of the instance of media content via a respective icon or menu item of the plurality of icons or menu items;
receive at least one user comment related to the selected perceptible image quality property;
storing the at least one user comment related to the selected perceptible image quality property;
determining an overall visual quality of the instance of media content based, at least in part, on a like indication included in the stored at least one user comment; and
ranking the instance of media content relative to other instances of media content based on the determined overall visual quality of the instance of media content.

12. The apparatus of claim 11, wherein the at least one comment comprises the like indication and a dislike indication.

13. The apparatus of claim 12, wherein the at least one user comment pertains to a selected area of the instance of media content.

14. The apparatus of claim 11, wherein determining the overall visual quality of the instance of media content comprises adding a number of like indications for all of the plurality of perceptible image quality properties of the instance of media content.

15. A non-transitory computer readable medium for storing computer instructions that, when executed by at least one processor cause the a computing device to store comments relating to perceptible image quality properties of media content by performing steps comprising:
 providing, for display to a user within a user interface, an instance of media content comprising a plurality of perceptible image quality properties of the instance of media content, wherein the plurality of perceptible image quality properties comprises at least one of a color, a brightness, an exposure, a contrast, a sharpness, a focus, framing, or field depth;
 providing, within the user interface, a plurality of icons or menu items overlaying the instance of media content and each identifying a respective perceptible image quality property of the plurality of perceptible image quality properties, wherein the plurality of icons or menu items are user selectable for entry of comments;
 receiving a user selection of a perceptible image quality property from the plurality of perceptible image quality properties of the instance of media content via a respective icon or menu item of the plurality of icons or menu items;
 receiving at least one user comment related to the selected perceptible image quality property;
 storing the at least one user comment related to the selected perceptible image quality property;
 determining an overall visual quality of the instance of media content based on, at least in part, on a like indication included in the stored at least one user comment; and
 ranking the instance of media content relative to other instances of media contents based on the determined overall visual quality of the instance of media content.

16. The non-transitory computer readable medium of claim 15, wherein the at least one user comment for the selected perceptible image quality property of the instance of media content comprises the like indication and a dislike indication.

17. The non-transitory computer readable medium of claim 16, wherein the at least one user comment applies to an identified area of the instance of media content.

18. The non-transitory computer readable medium of claim 15, wherein determining an overall visual quality of the instance of media content comprises adding a number of like indications received for all of the plurality of perceptible image quality properties of the instance of media content for which there are user comments.

19. The non-transitory computer readable medium of claim 15, the steps further comprising searching for and retrieving a plurality of instances of media content based on at least one perceptible image quality property.

20. The non-transitory computer readable medium of claim 19, the steps further comprising displaying the retrieved plurality of instances of media content in order of calculated measurements of overall visual quality.

* * * * *